United States Patent [19]
Karino

[11] Patent Number: 6,138,154
[45] Date of Patent: Oct. 24, 2000

[54] METHOD OF MANAGEMENT INFORMATION COMMUNICATION IN COMMUNICATION NETWORK AND MEMORY DEVICE FOR STORING A CONVERSION PROGRAM OF MANAGEMENT INFORMATION BETWEEN NETWORK CENTER AND SWITCHING NODES

[75] Inventor: Toshiyuki Karino, Tokyo, Japan

[73] Assignee: NEC Corporation, Tokyo, Japan

[21] Appl. No.: 09/201,804

[22] Filed: Dec. 1, 1998

[30] Foreign Application Priority Data

Dec. 1, 1997 [JP] Japan ................................ 9-330640

[51] Int. Cl.⁷ ........................... G06F 15/173; G06F 15/16
[52] U.S. Cl. ............................... 709/223; 709/246
[58] Field of Search ........................... 370/395; 709/203, 709/223, 242; 717/5; 707/3, 200; 714/26

[56] References Cited

U.S. PATENT DOCUMENTS

| | | | |
|---|---|---|---|
| 5,317,742 | 5/1994 | Bapat | 707/3 |
| 5,892,950 | 4/1999 | Rigori et al. | 717/5 |
| 5,898,832 | 4/1999 | Feridun | 709/203 |
| 5,966,713 | 10/1999 | Carlsund et al. | 707/200 |
| 6,012,152 | 1/2000 | Douik et al. | 714/26 |
| 6,052,371 | 4/2000 | Lemieux | 370/395 |

FOREIGN PATENT DOCUMENTS

| | | |
|---|---|---|
| 4-273634 | 9/1992 | Japan . |
| 6-152681 | 5/1994 | Japan . |
| 6-303288 | 10/1994 | Japan . |
| 7-239816 | 9/1995 | Japan . |

*Primary Examiner*—Le Hien Luu
*Attorney, Agent, or Firm*—Sughrue, Mion, Zinn Macpeak & Seas, PLLC

[57] ABSTRACT

A management information communication apparatus provided on an switching node side, which is used for a management information communication between a network management system center which is provided on a management side of a network management system in a communication network according to a Common Management Information Protocol (CMIP), and an switching node to be managed so called as an agent. This apparatus comprises a transfer syntax/abstract syntax conversion section for converting an instruction sentence formed of a transfer syntax to an abstract syntax composed of CMIS parameters; an abstract syntactic sentence/GUI conversion section for converting the abstract syntactic sentence to a Graphic User Interface (GUI) corresponding to an existing application software; a GUI/abstract syntactic sentence conversion section for converting the GUI expressed report such as an execution result of the application software corresponding to the GUI, an event occurred, and a state change in an switching node; an abstract syntax/transfer syntax conversion section for converting the abstract syntax to a transfer syntax; a CMIS/CMIP execution processing section for transferring the transfer syntax to the network management system center; and an OSI control section for interfacing to the manager.

3 Claims, 6 Drawing Sheets

METHOD OF MANAGEMENT INFORMATION COMMUNICATION IN COMMUNICATION NETWORK AND MEMORY DEVICE FOR STORING A CONVERSION PROGRAM OF MANAGEMENT INFORMATION BETWEEN NETWORK CENTER AND SWITCHING NODES

BACKGROUND OF THE INVENTION

1. Field of the Invention

The present invention relates to TMN (Telecommunication Management Network) among switching nodes and between a switching node and a network management center, more particularly to a method of a management information communication used in a communication system to perform a control information communication between a manager, the network management center, and an agent, a managed switching node, according to a CMIP (Common Management Information Protocol) and a recording medium for storing a conversion program of managing information interchanged between a switching node of the communication system and the network management center.

2. Description of the Related Art

The CMIP is an OSI (Open System Interface) network management protocol for performing an integrated management for resources within a telecommunication open system, and ranked at an application layer of an OSI primary reference model.

The OSI network management according to this CMIP is executed by a management information communication between a manager which manages an open system to perform a management and agents which are managed by the manager of the open system to be managed as described hereafter. Namely, the manager controls a managed object included in the managed open system through corresponding agent. Accordingly, for example, by defining the managed object, the manager can manage the network.

Furthermore, the manager can receive as a notice of the event occurred in the managed object under control through the CMIP.

Figure 1:
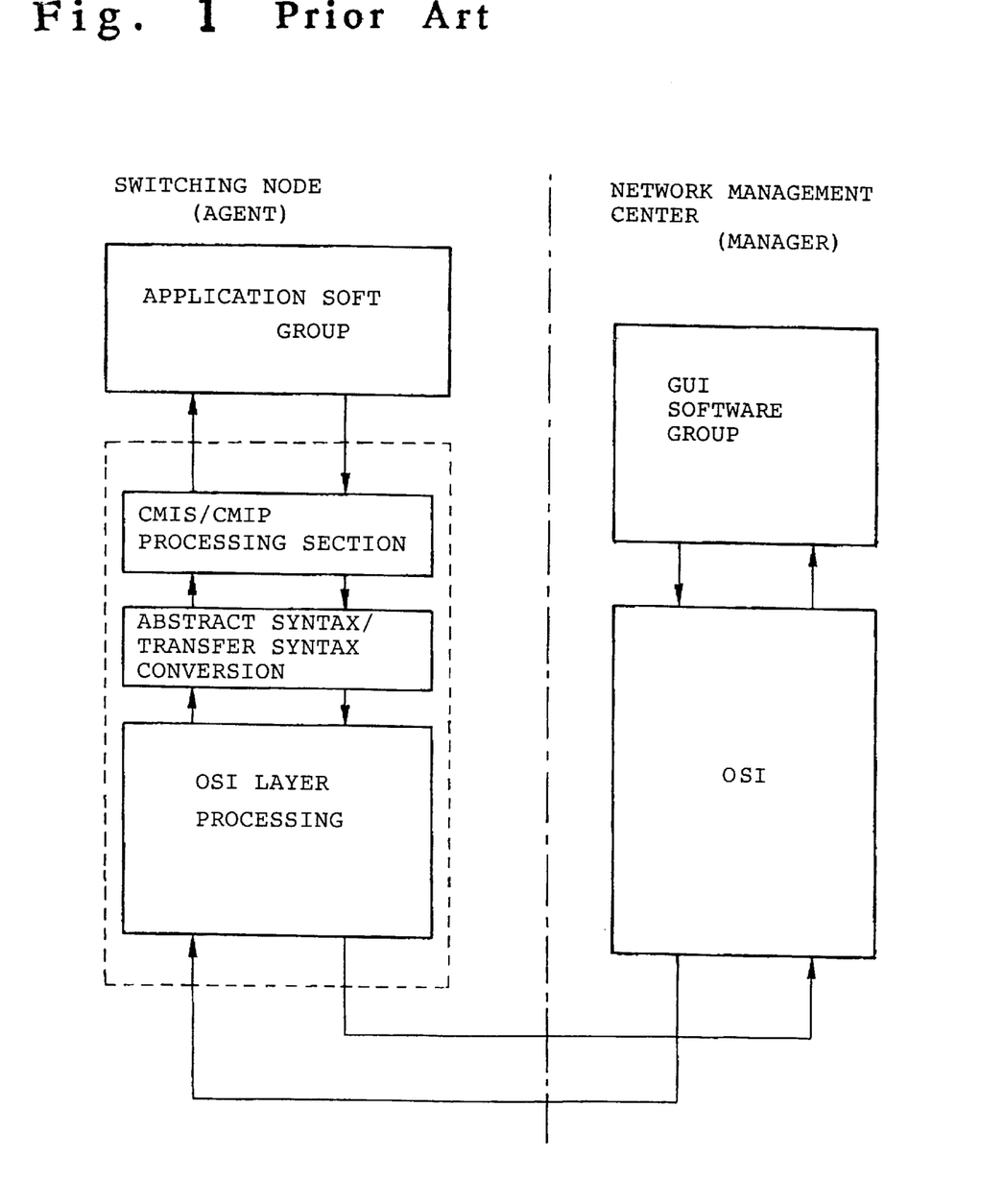
FIG. 1 is a block diagram showing a systematic connection of a communication system to which a conventional management information communication method is applied.

FIG. 1 shows a known conventional connection system structure between the agent and the manager who performs the network management through the management information communication.

However, with respect to the conventional structure as shown in FIG. 1, it has been necessary to make an application program capable of determining the management object for the network management, making a hierarchical structure of management classes, and coping with the parameters of CMIS (Common Management Information System).

Figure 10:
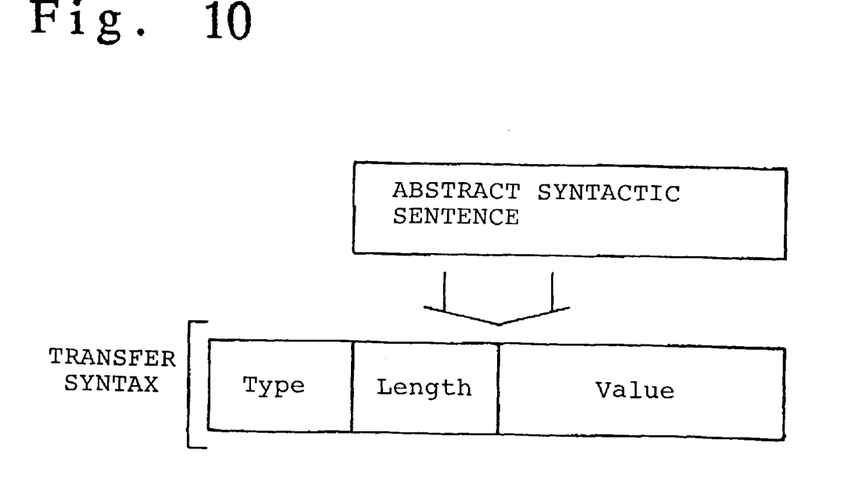
FIG. 10 is an explanatory view showing an example of an abstract syntax/transfer syntax conversion.

Therefore, when standardization of interfaces between switching nodes each other and between the switching nodes and the network management system center (hereinafter referred to as an network management center) as shown in FIG. 10, is progressed to apply to the TMN, there has been a problem that each application software must be registered by classifying it to an object-oriented correspondence and it is necessary to develop conventional application software that has been already developed.

With reference to the management information communication, there has been, for example, an agent system disclosed in Japanese Patent Laid-Open No. 239816/1995. In this technology, it is necessary to constitute a GDMO (Guide Line for the Definition of Managed Object) that defines the management object to increase a processing efficiency of the management operation and exclusively used software that defines and classifies an OID (Object Identifier) that is a management object identifier.

Therefore, in this prior art, when a large scale software system like a function of the switching node is constructed, a large number of developing steps are needed, so that the prior art is not appropriate to solve the foregoing problem. Moreover, as another prior art, there is a CMIP-SNMP (Simple Network Management Protocol) gate way disclosed in Japanese Patent Laid-Open No. 152681/1996. When an addition of function and change for the CMIP and the SNMP protocol conversion occurs, a problem that readjustments for this protocol conversion table and moreover the readjustment of the present software program itself are required in certain circumstances.

The present invention was invented from the viewpoints of the above-described circumstances. The object of the present invention is to provide a method of management information communication in a communication system capable of realizing a TMN interface while succeeding an interface as developed as a GUI (Graphic User Interface) interface that is a maintenance function of an switching node and using an application as developed, and changing and adding a service and a function without affecting the TMN interface itself in spite of the fact that the addition and change of the service and the function occur. Another object of the present invention is to provide a recording medium which stores a conversion program for the switching node of the communication system and the management information communication.

SUMMARY OF THE INVENTION

A method of management information communication in a communication system of the present invention is characterized in that an instruction sentence composed of a transfer syntax that is sent from a network management center is converted to an abstract syntax composed of parameters of a CMIS in an switching node, this abstract syntax is converted to a format of GUI corresponding to existing application software, the format of GUI is transferred to the foregoing application software, a GUI expressed reports such as an execution result of the application software, or events and state changes occurred in the switching node is converted to an abstract syntactic sentence, and this abstract syntactic sentence is transmitted to the foregoing network management system after converting the abstract syntax to a transfer syntax.

A switching node in a communication system of the present invention comprises transfer syntax/abstract syntax conversion means for converting an instruction sentence composed of a transfer syntax sent from a network management center to an abstract syntactic sentence composed of parameters of a CMIS; abstract syntactic sentence/GUI conversion means; GUI/abstract syntactic sentence conversion means for converting a GUI expressed reports such as an execution result of application software, or events and state changes occurred in an switching node to an abstract syntactic sentence and abstract syntax/transfer syntax conversion means for converting the foregoing abstract syntax to a transfer syntax.

A recording medium of the present invention stores a transfer syntax/abstract syntax conversion processing routine, an abstract syntax /GUI conversion processing routine for converting an abstract syntactic sentence composed of CMIS parameters to a format of GUI corresponding to application software for maintenance of an switching node, a GUI/abstract syntax conversion processing routine for converting GUI expressed reports such as an execution result of the foregoing application software, events and state changes occurred in the switching node to an abstract syntactic sentence and an abstract syntax/transfer syntax converter to convert the abstract syntax to a transfer syntax to transfer the report to the manager, fully or as at least a part of the conversion program for a management information communication.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Embodiments of the present invention will be described with reference to the accompanying drawings.

Figure 2:
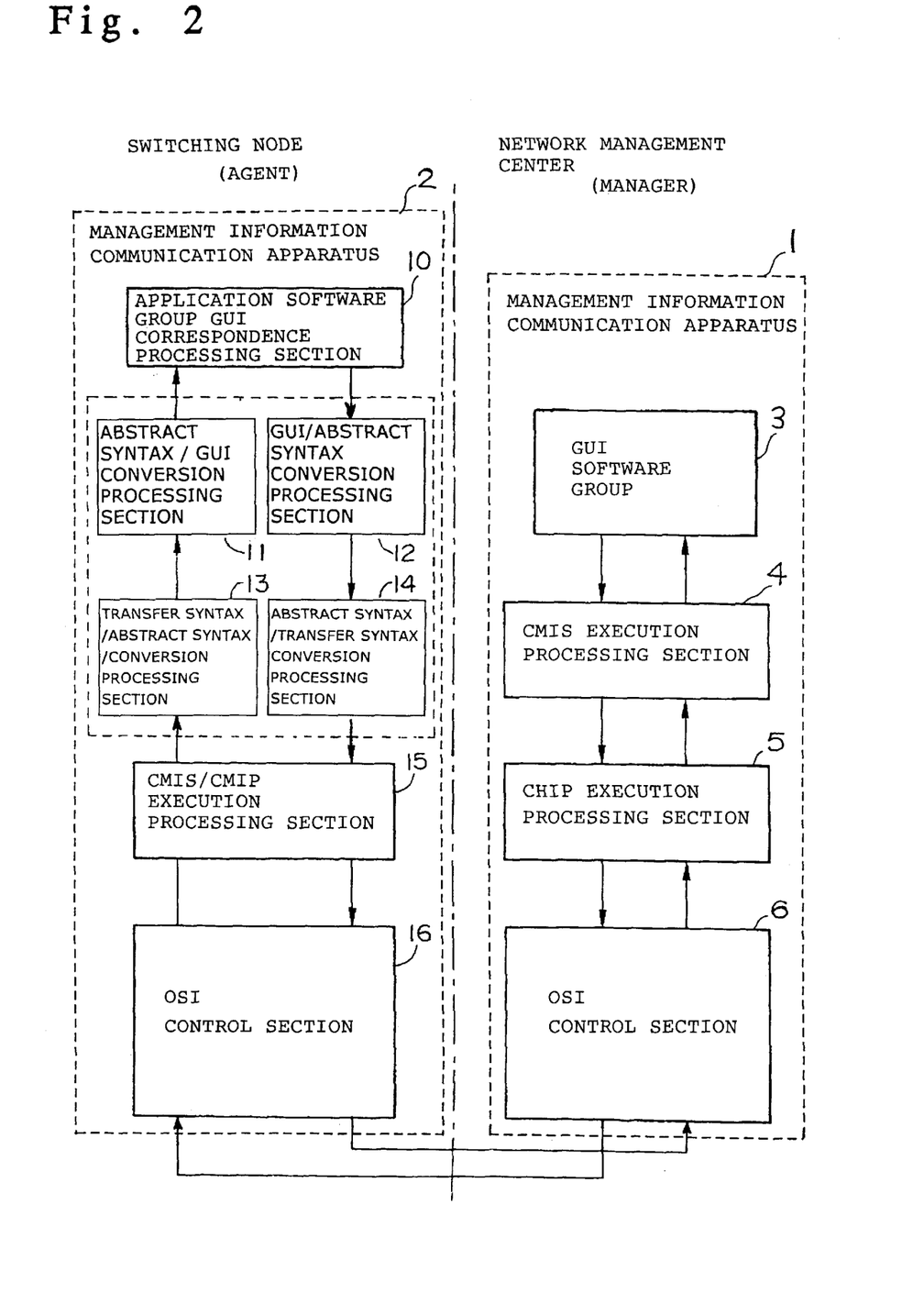
FIG. 2 is a block diagram showing a systematic connection of a communication system to which a management information communication method of the present invention is applied.
Figure 3:
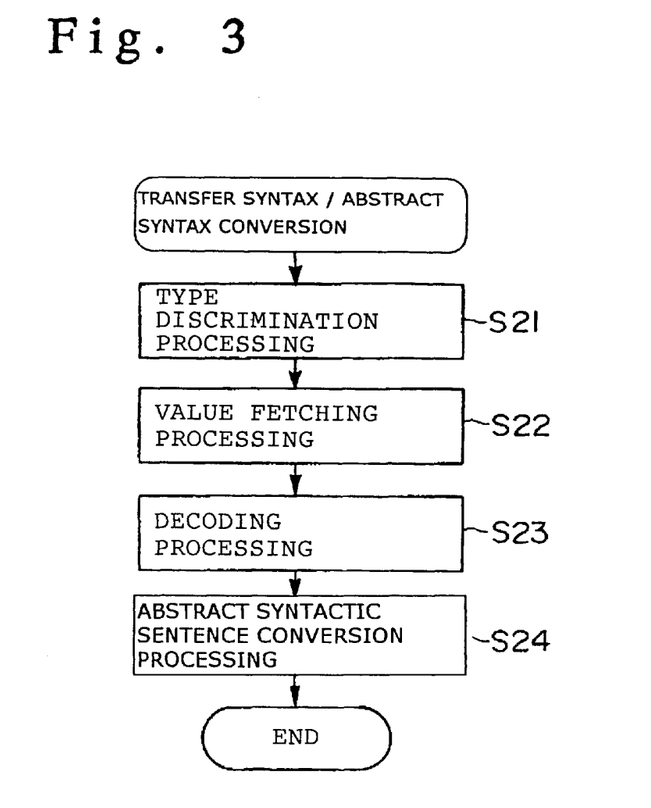
FIG. 3 is a flowchart of a transfer syntax/abstract syntax conversion processing section 13 shown in FIG. 2.
Figure 4:
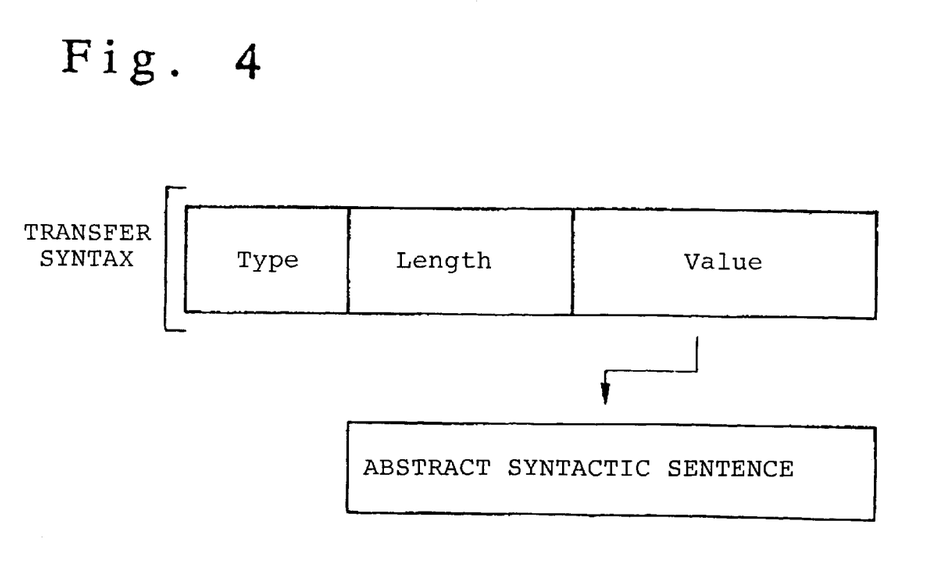
FIG. 4 is an explanatory view of a conversion processing of a transfer syntax/abstract syntax.

FIG. 2 is a block diagram showing a systematic connection of a communication system to which a method of management information communication of the present invention is applied. FIG. 3 is a flowchart of a transfer syntax/abstract syntax conversion processing section 13 shown in FIG. 2. FIG. 4 is an explanatory view of a conversion processing of a transfer syntax/abstract syntax.

A communication system shown in FIG. 2 shows a management center of a network management system referred to as a manager, an switching node provided on a managed side, which is referred to as an agent, and lines which connect there between.

Management information communication apparatus 1 of the management center, a manager apparatus, comprises memory section 3 which stores all of existing GUI software; CMIS execution processing section 4; CMIP execution processing section 5; and OSI control section 6.

Switching node 2 provided on the managed side comprises GUI correspondence processing section 10 which stores and executes application software as the management information communication apparatus to which a management information communication is applied; OSI control section 16; CMIS/CMIP execution processing section 15; transfer syntax/abstract syntax conversion processing section 13; abstract syntax/GUI conversion section 11; GUI/abstract syntax conversion section 12; and abstract syntax/transfer syntax conversion section 14.

A communication between management center 1 and switching node 2 is performed by the CMIS and CMIP of the OSI management system.

The connection between management center 1 and switching node 2 must be done according to a recommendation of an international telecommunication union (ITU-T) and data transference between the network management center and the switching node must be modeled on an abstract syntax and a transfer syntax.

An instruction sentence sent from the network management center is received by OSI control section 16 in the switching node, and becomes a processing object of CMIS/CMIP execution processing section 15.

Since the instruction sentence from the network management center is a transfer syntactic sentence, the instruction sentence is converted to an abstract syntactic sentence composed of parameters of the CMIS by transfer syntax/abstract syntax conversion processing section 13. Then, an abstract syntactic sentence obtained by transfer syntax/abstract syntax conversion processing section 13 is converted to a GUI by abstract syntax/GUI conversion processing section 11, which is capable of understanding existing application software. Therefore, existing application software executes an instruction from the network management center.

An execution result of existing application software based on the instruction must be reported to the network management center. Furthermore, events and state changes generated in the switching node must be reported similarly to the network management center. The GUI expressed reports such as the execution result, events and state changes of the switching nodes have to be converted to an abstract syntactic sentence by GUI/abstract syntax processing section 12, and this abstract syntactic sentence is converted to a transfer syntax by abstract syntax/transfer syntax conversion processing section 14 and sent to the network management center.

Accordingly, when viewing from existing application software, the execution result and the like can be reported without changing contents of the application processing according to existing method of management information communication.

It should be noted that various types of conversion means 11 to 15 described above are composed of software stored in a recording medium such as a memory disk.

An operation of each section in this embodiment will be described.

FIG. 3 is a flowchart showing processing contents of transfer syntax/abstract syntax conversion processing section 13. FIG. 4 shows a transfer syntax that is a processing object of transfer syntax/abstract syntax conversion processing section 13 and an abstract syntax that is output information. In this transfer syntax/abstract syntax conversion section 13, when the content of the transfer syntax is fetched out, the type of the transfer syntax is determined and the data form is determined depending on the type of the transfer syntax (step S21). Next, the length of the transfer syntax is obtained, and the management value of the data is fetched from the transfer syntax (step S22). Here, since the data is encoded by an algorithm according to the ITU-T recommendation, it is possible to translate the data according to a predetermined rule (step S23). Then, after the translation, a conversion processing to an abstract syntax which has been decided by the network management center and the switching node is performed.

Figure 5:
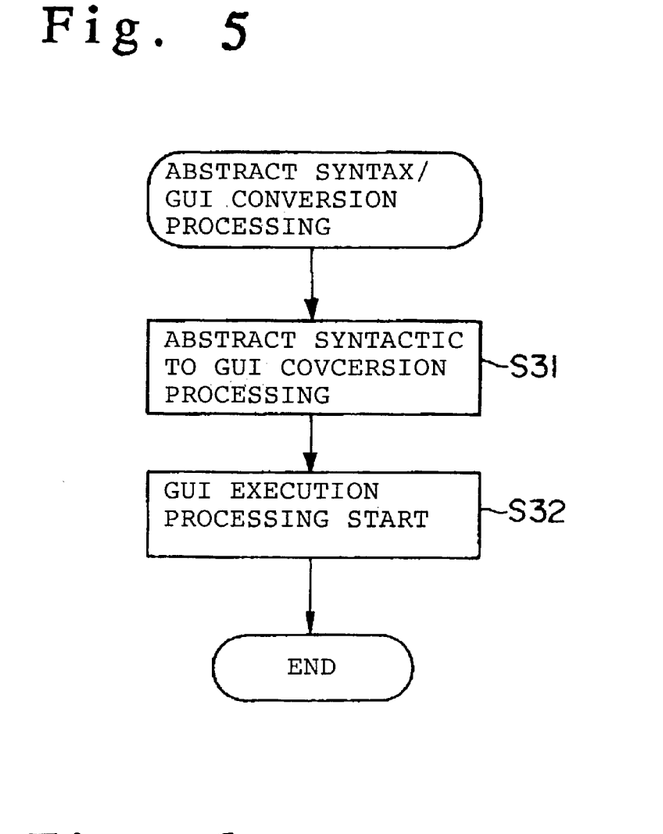
FIG. 5 is a flowchart of an abstract syntax/GUI conversion processing section 11 shown in FIG. 2.
Figure 6:
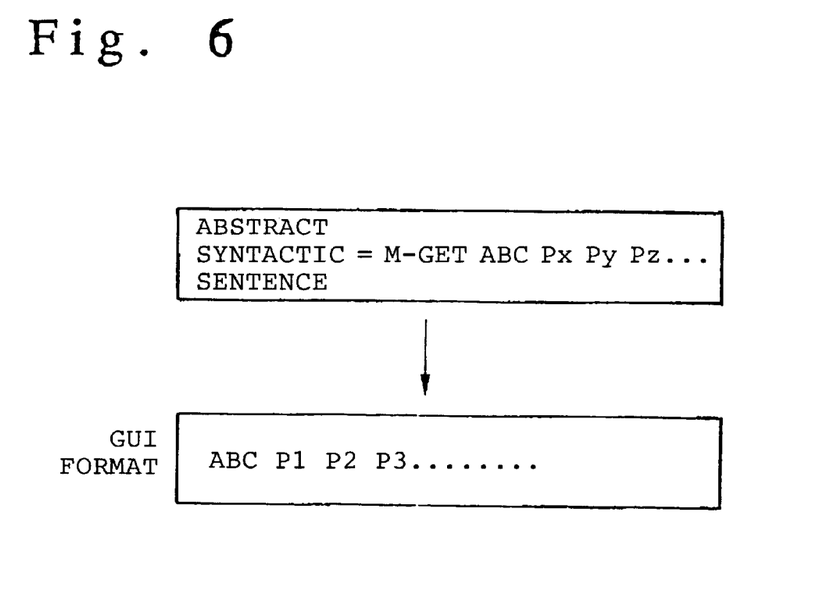
FIG. 6 is an explanation view showing an example of an abstract syntax/GUI conversion.

FIG. 5 is a flowchart showing a processing of abstract syntax/GUI conversion processing section 11, and FIG. 6 is a figure exemplifying an abstract syntactic sentence that is a processing object of abstract syntax/GUI conversion processing section 11 and a GUI expression of a processed result. In this abstract syntax/GUI conversion processing section 11, the abstract syntactic sentence converted by transfer syntax/abstract syntax conversion processing section 13 is converted to a GUI as is exemplified in FIG. 6 (step S31), and an execution by application software, which corresponds to this GUI, starts up (step S32).

Figure 7:
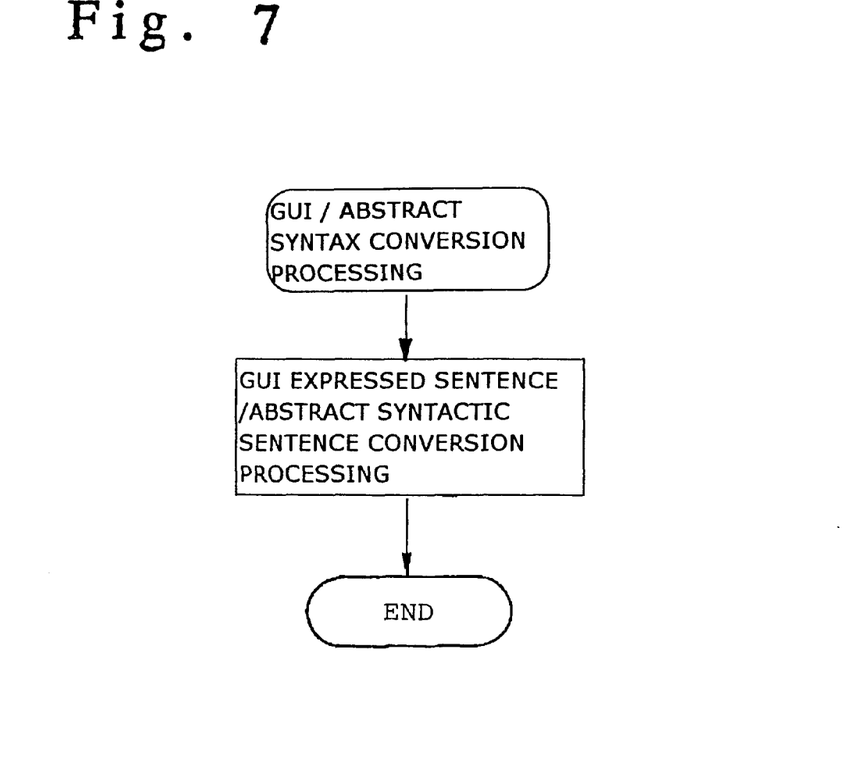
FIG. 7 is a flowchart of a GUI/abstract syntax conversion processing shown in FIG. 2.
Figure 8:
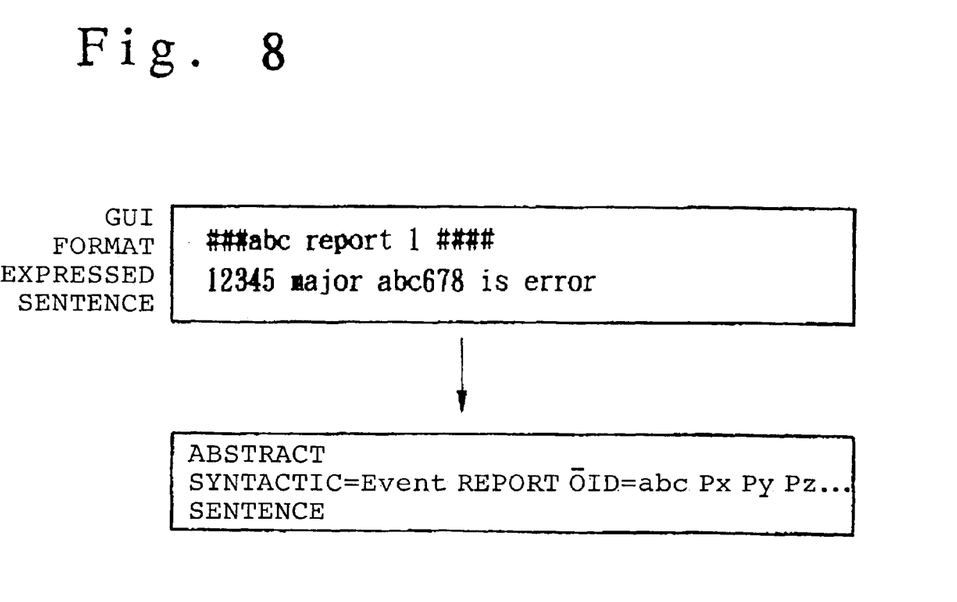
FIG. 8 is an explanation view showing an example of a GUI/abstract syntactic sentence conversion.

FIG. 7 is a flowchart showing a processing content of GUI/abstract syntax conversion processing section 12, and FIG. 8 is a figure exemplifying a GUI that is a processing object of GUI/abstract syntax conversion processing section 12 and an abstract syntactic sentence of the processed result. In this GUI/abstract syntax conversion processing section 12, a GUI expressed report such as the execution result of an application software by the switching node and events and state changes which occurred in the switching node are converted to the abstract syntactic sentence.

Figure 9:
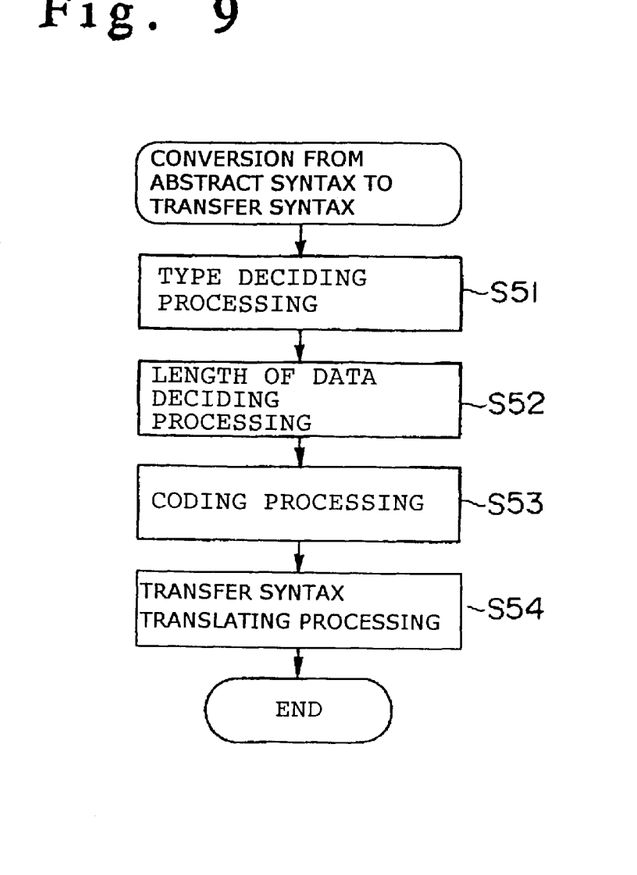
FIG. 9 is a flowchart of an abstract syntax/transfer syntax conversion processing.

FIG. 9 is a flowchart showing a processing of abstract syntax/transfer syntax conversion processing section 14, and FIG. 10 is a figure exemplifying an abstract syntactic sentence that is a processing object of abstract syntax/transfer syntax conversion processing section 14 and a transfer syntax that is a processing result thereof. In this abstract syntax/transfer syntax conversion processing section 14, the determination of the type of the transference (step S51), the determination of the length of the data (step S52), and the encoding processing for making the value of the transfer syntax (step S53) are executed, and making of the final transfer syntax is performed (step S54).

As described above, according to the present invention, through the processing of CMIS/CMIP execution processing section 15 and transfer syntax/abstract syntax conversion processing section 14, the abstract syntax corresponding to the CMIS received from the manager side is converted to the GUI. The GUI is transferred to corresponding application of the software group.

The other hand, the GUI expressed reports of the application software group of the agent is converted to an abstract syntactic sentence corresponding to the CMIS.

Through the processing of abstract syntax/transfer syntax conversion processing section 14 and CMIS/CMIP execution processing section 15, the abstract syntactic sentence is returned to the network management center on the manager side.

Accordingly, a TMN interface can be realized by using the one which has been developed as the GUI interface that is a maintenance function and the application software which is developed already. Moreover, even when addition and change of services and function occur, the addition and the change of the services and functions are possible without affecting the TMN interface.

Although the preferred embodiment of the present invention has been described in detail, it should be understood that various changes, substitutions and alternations can be made therein without departing from spirit and scope of the inventions as defined by the appended claims.

What is claimed is:

1. A method of management information communication between a network management system center called as a manager, which manages the communication network according to a Common Management Information Protocol (CMIP), and at least one switching node called as an agent which is managed by the manager, comprising the steps of:

transmitting, a management instruction sentence composed of a transfer syntax in accordance with an algorithm based on ITU-T recommendation from the network management system center to at least a specified switching node;

converting the management instruction sentence formed according to the transfer syntax to an abstract syntactic sentence composed of parameters of a CMIS which is regulated within the management information communication system, at the specified switching node on receiving the management instruction sent from the network management center;

converting said abstract syntactic sentence to a format of Graphic User Interface (GUI) corresponding to an existing application software;

transferring said GUI to said application software;

converting GUI expressed sentences of an execution result of said application software, an event occurred in the switching node, and a state change to an abstract syntactic sentences; and converting the abstract syntactic sentences to transfer syntax and transmitting the transfer syntax to said network management system center.

2. A management information communication apparatus provided at a switching node for a management information communication between a network management system center called as a manager, which is provided for managing a network management system in a communication network according to a Common Management Information Protocol (CMIP), and at least one switching node called as an agent which is managed by the manager, said apparatus comprising:

a transfer syntax/abstract syntax conversion means for converting a received instruction sentence composed of transfer syntax according to an algorithm regulated by an ITU-T recommendation to an abstract syntax composed of parameters of a CMIS which is defined in the network management system;

abstract syntax/GUI conversion means for converting said abstract syntactic sentence to a format of Graphic User Interface (GUI) corresponding to an existing application software;

GUI/abstract syntax conversion means for converting GUI expressed reports, namely a result of execution of the application software corresponding to said instruction, an event and a state change occurred within the switching node;

abstract syntax/transfer syntax conversion means for converting said abstract syntactic sentences to a transfer syntax; and means for transmitting said transfer syntax to the network management system center.

3. A recording medium provided for a switching node thereat, said recording medium stores a program of a method of management information communication between a network management system center called as a manager which is provided for managing a network management system according to a Common Management Information Protocol (CMIP) and at least one switching node called as an agent which is managed by the manager, wherein the recording medium stores, at least one of following conversion programs for a management information communication:

- a transfer syntax/abstract syntax conversion processing routine for converting an instruction sentence composed of a transfer syntax received from a manager, to an abstract syntax composed of parameters of Common Management Information Service (CMIS);
- an abstract syntactic sentence/GUI conversion processing routine for converting the abstract syntactic sentence composed of the CMIS parameters to a format of Graphic User Interface (GUI) corresponding to application software for maintenance of an switching node;
- a GUI/abstract syntax conversion processing routine for converting a GUI expressed reports namely an execution result of the said application software, events and state changes occurred in the switching node to a abstract syntactic sentences; and an abstract syntax/transfer syntax conversion processing routine for converting an abstract syntactic sentence to a transfer syntax for a transmission to the manager.

* * * * *